United States Patent [19]

Meff

[11] 4,177,520
[45] Dec. 4, 1979

[54] CALCULATOR APPARATUS HAVING A SINGLE-STEP KEY FOR DISPLAYING AND EXECUTING PROGRAM STEPS AND DISPLAYING THE RESULT

[75] Inventor: Randall B. Meff, Menlo Park, Calif.

[73] Assignee: Hewlett-Packard Company, Palo Alto, Calif.

[21] Appl. No.: 604,696

[22] Filed: Aug. 14, 1975

[51] Int. Cl.² ............................................. G06F 3/14
[52] U.S. Cl. ................................... 364/900; 364/710
[58] Field of Search ................... 340/172.5, 365.5; 445/1; 364/200 MS File, 900 MS File, 706, 710

[56] References Cited

U.S. PATENT DOCUMENTS

| | | | |
|---|---|---|---|
| 3,541,526 | 11/1970 | Levy et al. | 364/200 |
| 3,594,734 | 7/1971 | Wang et al. | 364/200 |
| 3,737,863 | 6/1973 | Rowland et al. | 364/200 |
| 3,750,109 | 7/1973 | Smith | 340/172.5 |
| 3,760,171 | 9/1973 | Wang et al. | 364/200 |
| 3,768,078 | 10/1973 | Williams | 364/200 |
| 3,769,621 | 10/1973 | Osborne | 340/172.5 |
| 3,798,614 | 3/1974 | Meadows et al. | 340/172.5 |
| 3,815,097 | 6/1974 | Gardner et al. | 364/200 |
| 3,855,461 | 12/1974 | Stockwell | 340/172.5 |
| 3,859,635 | 1/1975 | Watson et al. | 340/172.5 |
| 3,876,987 | 4/1975 | Dalton et al. | 340/172.5 |

OTHER PUBLICATIONS

Reference Manual: IBM 7080 Data Processing System, IBM Corporation, Dec. 1961, pp. 82-90.

*Primary Examiner*—Mark E. Nusbaum
*Attorney, Agent, or Firm*—Roland I. Griffin

[57] ABSTRACT

A programmable electronic calculator is provided having an LED display device and a single-step key for causing display and execution of individual steps of a program stored in the calculator, and for causing display of the results of said execution by means of a single actuation of the single-step key. As the key is depressed, the next program step that is to be executed is displayed, together with the number of that step in the program. When the key is released, the program step is executed and the result is displayed.

9 Claims, 5 Drawing Figures

CALCULATOR APPARATUS HAVING A SINGLE-STEP KEY FOR DISPLAYING AND EXECUTING PROGRAM STEPS AND DISPLAYING THE RESULT

BACKGROUND OF THE INVENTION

In most prior art digital computers, as many as three display registers are provided to aid the computer user in debugging or finding errors in a program stored in the computer when the user single-steps through the program by depressing or actuating a single-step key of the computer. Each time the single-step key is actuated, a single program step or instruction of the program is executed, and at least three types of program information are displayed, as indicated below:

(1) the result of the execution is displayed in a first display register;

(2) the next instruction to be executed is displayed in a second display register; and (3) the step or sequence number of the next instruction to be executed is displayed in a third display register.

Thus, to execute a single program instruction and to display the above three types of program information by means of a single actuation of a single-step key, three display registers are generally required in a digital computer. Such multi-register displays are unduly costly when compared to single-register displays that are utilized in some electronic calculators.

Many known electronic calculators have only a single display, but they often require a multi-step rather than a single-step operation to be performed in order to single-step through a program stored in the calculator. For example, a typical calculator would require approximately four steps to be performed in order for the calculator to display a keycode that is to be executed, to execute said keycode, and to display the results of such execution. Typically, as a first step, a PROGRAM-RUN switch of the calculator would be set to "PROGRAM" representing the program-entry or program display mode of operation of the calculator. As a second step, a SINGLE-STEP key of the calculator would be actuated to display the keycode that is scheduled for execution following the next keycode to be executed. As a third step, the PROGRAM-RUN switch would be reset to "RUN" representing the execution mode of operation of the calculator. As a fourth step, the SINGLE-STEP key would be actuated again, this time to cause the execution of the next keycode to be executed and a display of the results of said execution. An electronic calculator of this type is described in the literature (see, for example, Hewlett-Packard Journal, Vol. 20, No. 1, September 1968). Compared to the multi-register displays of a computer, therefore, an electronic calculator's single display has the advantage of a lower cost display, but the calculator's multi-key or multiple key actuation operation required to step through a program is an operational disadvantage because it increases the chances of operator error as compared with a single-key, single actuation operation.

SUMMARY OF THE INVENTION

Thus, in accordance with the illustrated preferred embodiment of the present invention, there is provided an electronic calculator having a single display and a SINGLE-STEP key for causing the calculator to step through a program stored in the calculator. In stepping through the program, the calculator displays and executes one step or keycode of the program at a time, and displays the result of said execution by means of a single actuation of the SINGLE-STEP key. As the SINGLE-STEP key is depressed, a keycode is displayed, together with the step number of that keycode in the program, said displayed keycode being the keycode logically scheduled to be executed next. When the SINGLE-STEP key is released, the keycode is executed and the result is displayed.

DESCRIPTION OF THE PREFERRED EMBODIMENT

Figure 1:
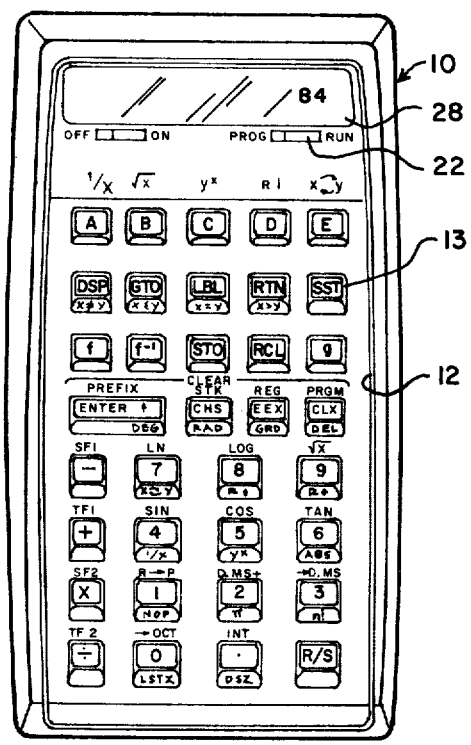
FIG. 1 is a front view of a programmable electronic calculator.
Figure 2:
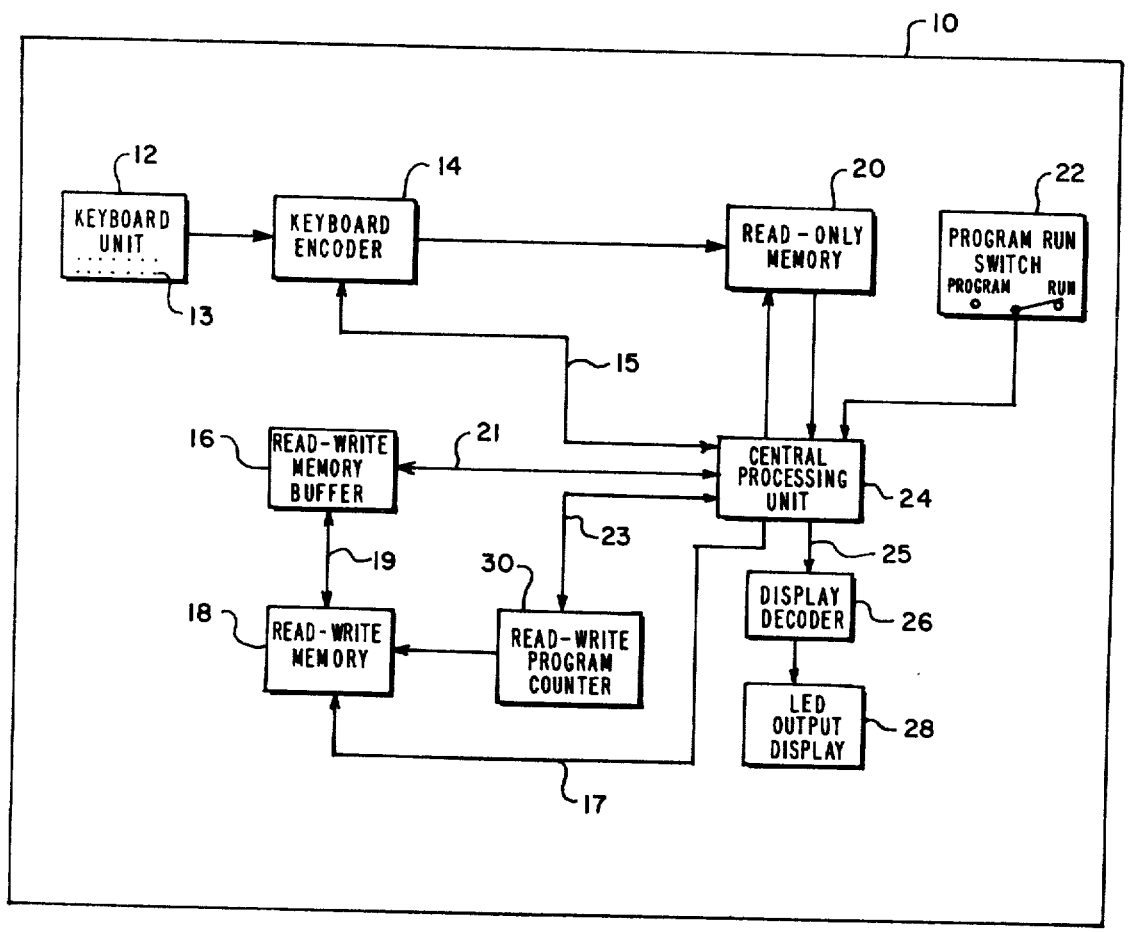
FIG. 2 is a block diagram of the calculator of FIG. 1 including a read-write program counter in accordance with the preferred embodiment of the present invention.

FIG. 1 shows a programmable electronic calculator 10 comprising a keyboard input unit 12 having a single-step (SST) key 13, a program-run switch 22, and an LED output display unit 28. A block diagram in FIG. 2 shows calculator 10 additionally comprising a keyboard encoder 14, a read-write memory buffer (RWMB) 16, a read-write memory (RWM) 18, a read-only memory (ROM) 20, a central processing unit (CPU) 24 and a display decoder 26. The calculator 10 and the aforementioned elements thereof may be constructed and operated in the same manner shown and described in detail in U.S. Pat. No. 3,855,461 entitled "Calculator with Key Code Association and Display Features", issued Dec. 17, 1974 to Richard Kent Stockwell, and incorporated herein by reference.

FIG. 2 additionally shows a read-write program counter (RWPC) 30 employed in the calculator 10 in accordance with the preferred embodiment of this invention. The counter 30 may be constructed, for example, in the manner shown and described in column 22, lines 31–33; column 54, lines 66–67; and in column 55, lines 1–5 in U.S. Pat. No. 3,859,635 entitled "Programmable Calculator", issued Jan. 7, 1975 to Robert E. Watson, et al., and incorporated herein by reference. The counter 30 operates under the control of the CPU 24. When the calculator 10 is in program mode, i.e., when the program-run switch 22 is set to "program", the counter 30 assigns a sequential count or step number to the individual keycodes entered into the calculator 10 by a user via the keyboard input unit 12. The keycodes constitute the user's program and are stored into the read-write memory 18 of the calculator 10. When this switch 22 is set to "run" as shown in FIG. 2, indicating that the calculator 10 is in program-execution mode, the user may single-step through the program stored in the memory 18 of the calculator 10 by pressing the SST key 13.

Figure 3:
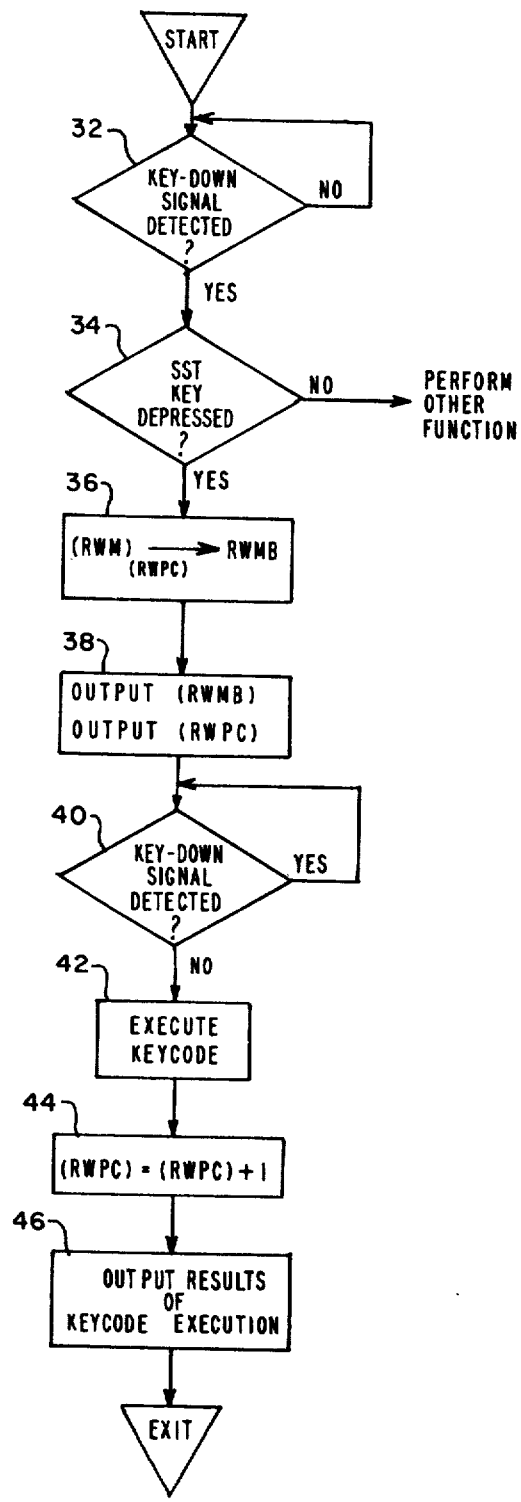
FIG. 3 is a logic flow diagram of a routine stored in a read-only memory of the calculator of FIG. 2 for performing single-step operations.
Figure 4:
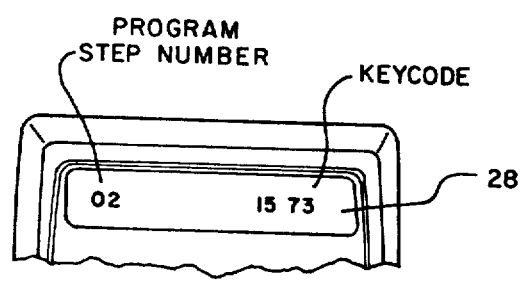
FIG. 4 is an illustration of a keycode and step number displayed by the calculator of FIG. 2 in response to a depression of a single-step key.

When the SST key 13 is depressed, the keyboard encoder 14 generates a key-down signal and an 8-bit keycode representing the SST key 13, and transmits the signal and the SST keycode to the CPU 24 via line 15. By means of a control routine stored in the ROM 20, the CPU 24 continually monitors and tests the output received from the encoder 14. Table 1 shows a listing of the individual instructions of this control routine. The monitoring, testing and other operations performed by the CPU 24 under the control of this routine are illustrated in the flow chart of FIG. 3. In the block 32 of the flow chart, a test is made by the CPU 24 to determine if a key-down signal is received from the encoder 14. If a key-down signal is not received from the encoder 14 by the CPU 24, the CPU continues testing until a key-down signal is received. When a key-down signal is received from the encoder 14, the CPU 24 makes a further test, as indicated by block 34, to determine if the 8-bit keycode next received from the encoder 14 is an SST keycode. This test is performed by branching to the ROM address specified by the 8-bit keycode. If the input keycode is not an SST key-code but the keycode of some other key of the calculator 10, the function of that other key is performed. However, if the input keycode is an SST keycode, then as block 36 shows, the step number in the read-write program counter 30 is used as a memory address by the CPU 24 to access, via line 17, the memory location having that address in the read-write memory 18. The accessed memory location contains a keycode of the user's program that is to be displayed. This keycode is then transferred by the CPU 24 from read-write memory 18 to the read-write memory buffer 16, via line 19. In block 38, this keycode in the read-write memory buffer 16 and the step number in the read-write program counter 30 are then nondestructively transferred to the CPU 24 via lines 21 and 23. The CPU 24 translates the keycode and its step number into a display code, and forwards the display code via line 25 to the display decoder 26, which decodes and formats the display code for display by the LED output display unit 28. FIG. 4 illustrates the form of this display.

Figure 5:
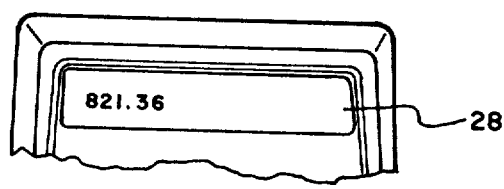
FIG. 5 is an illustration of a result that is displayed by the calculator of FIG. 2 when a keycode is executed in response of the single-step key.

When the depressed SST key 13 is released, the encoder 14 terminates the transmission of the key-down signals to the CPU 24. As block 40 of FIG. 3 shows, after forwarding the display code corresponding to the keycode and its step number to the display decoder 26 for display, the CPU 24 then tests the output from the encoder 14 for a key-down signal. If a key-down signal is detected by the CPU 24, indicating that the SST key 13 is still depressed and not released, the CPU 24 continues to test until no key-down signal is detected. When no key-down signal is detected, indicating that the SST key is released, the CPU 24 executes the keycode stored in the read-write memory buffer 16. This operation is shown by block 42. Following keycode execution, the CPU 24 increments by one the step number stored in the read-write program counter 30, this operation is shown by block 44. In block 46, the CPU 24 then transfers, via line 25, the result of the execution of the keycode to the display decoder 29 for display by the LED output display unit 28. An example of one such result is shown in FIG. 5.

TABLE 1

LISTING OF SUBROUTINES OF SINGLE-STEP ROUTINE

| Object Code | Step Number & ROM Address (in octal) | Sub-routine Label | Keycode | | Remarks | |
|---|---|---|---|---|---|---|
| 001714 | 0470 | $WAIT: | 0 -> S KEY | 15 | WAIT HERE FOR KEY UP | B8 |
| 000274 | 0471 | | P + 7 | | | |
| 000620 | 0472 | WAIT1: | P - 1 -> P | | | |
| 001354 | 0473 | | IF P # 0 | | | |
| 140012 | 0474 | | THEN GO TO WAIT1 | | | |
| 001724 | 0475 | | IF 1 = S KEY | 15 | | |
| 40501 | 0476 | | THEN GO TO $WAIT | | | |
| 001020 | 0477 | | RETURN | | | E |
| 130014 | 0500 | KRCL: | GO TO ERCL | | RECALL KEY | |
| 130016 | 0501 | KSTO: | GO TO ESTO | | STORE KEY | |
| 000756 | 0502 | KROLL: | C + 1 -> C[X ] | | ROLL DOWN KEY | |
| 130021 | 0503 | KXEXY: | IF N/C GO TO KXEXY1 | | X EXCHANGE Y KEY | |
| 000756 | 0504 | KSIG+: | C + 1 -> C[X ] | | SIGMA PLUS KEY | |
| 130017 | 0505 | | IF N/C GO TO KROLL | | ALWAYS | |
| 000756 | 0540 | K9: | C + 1 -> C[X ] | | 9 KEY | |
| 130034 | 0541 | K8: | IF N/C GO TO K7. | | 8 KEY | |
| 130036 | 0542 | K7: | GO TO K6. | | 7 KEY | |
| 001624 | 0543 | K-: | IF 1 = S STO | 14 | MINUS KEY | |
| 140000 | 0544 | | THEN GO TO ESTO1 | | | |
| 000756 | 0560 | K3: | C + 1 -> C[X ] | | 3 KEY | |
| 000756 | 0561 | K2: | C + 1 -> C[X ] | | 2 KEY | |
| 30046 | 0562 | K1: | IF N/C GO TO K1. | | 1 KEY | |
| 000756 | 0563 | K*: | C + 1 -> C[X ] | | * KEY | |
| 130050 | 0564 | | IF N/C GO TO K+ | | ALWAYS | |
| 000040 | 0620 | KR/S: | SELECT ROM 0 | | R/S KEY | |
| 130057 | 0621 | K.: | GO TO K.. | | . KEY | |
| 001020 | 0622 | K0: | RETURN | | 0 KEY | |

| Object Code | Step Number & ROM Address (in octal) | Sub-routine Label | Keycode | Remarks |
|---|---|---|---|---|
| 000756 | 0623 | K/: | C + 1 -> C[X ] | 0 KEY |
| 130047 | 0624 | | IF N/C GO TO K* | ALWAYS |
| 000756 | 0640 | K6: | C + 1 -> C[X ] | 6 KEY |
| 130041 | 0641 | K5: | IF N/C GO TO K5. | 5 KEY |
| 130042 | 0642 | K4: | GO TO K3. | 4 KEY |
| 000756 | 0643 | K+: | C + 1 -> C[X ] | + KEY |
| 130037 | 0644 | | IF N/C GO TO K- | ALWAYS |
| 130062 | 0650 | KF: | GO TO EF | F KEY    GOLD |
| 130052 | 0661 | KGTO: | GO TO EGTO | GTO KEY |
| 000340 | 0662 | KBST: | SELECT ROM 3 | BST KEY |
| 000340 | 0663 | BSST: | SELECT ROM 3 | SST KEY |
| 010011 | 0664 | KG: | JSB ZAP | G KYE  BLUE      B23 |
| 130100 | 0720 | KEEX: | IF N/C GO TO EEX | EEX KEY |
| 000040 | 0721 | KCHS: | SELECT ROM 0 | CHS KEY |
| 000000 | 0722 | | | ROYAL HOLE |
| 130103 | 0723 | KENTER: | GO TO EENTER | ENTER KEY |
| 000756 | 0724 | KCLX: | C + 1 -> C[X ] | CLX KEY |
| 000314 | 0742 | DISPL5: | 0 -> S RUNPGM 3 | TRY TO CLEAR SWITCH |
| 000321 | 0743 | | IF 0 = S RUNPGM 3 | |
| 140106 | 0744 | | THEN GO TO $SST4 | SWITCH CHANGED TO PRGM |
| 001734 | 0745 | | IF 0 = S KEY    15 | |
| 140106 | 0746 | | THEN GO TO DISPL5 | NO KEY |
| 130107 | 0747 | | GO TO DISPL3 | |
| 000110 | 0750 | EFIRST: | CLEAR STATUS | DISPLAY LOOP |
| 000210 | 0751 | EFIRS1: | DISPLAY TOGGLE | DISPLAY LOOP |
| 010501 | 0752 | DISPL1: | JSB $WAIT | WAIT FOR THE KEY TO COME UP |
| 001760 | 0753 | | HI I'M WOODSTOCK | |
| 000324 | 0754 | | IF 1 = S RUNPGM 3 | |
| 140106 | 0755 | | THEN GO TO DISPL5 | RUNNING |
| 000324 | 0756 | DISPL6: | IF 1 = S RUNPGM 3 | |
| 140467 | 0757 | | THEN GO TO $OUTPU | SWITCH CHANGED TO RUN |
| 001734 | 0760 | | IF 0 = S KEY    15 | |
| 140111 | 0761 | | THEN GO TO DISPL6 | NO KEY |
| 000310 | 0762 | DISPL3: | DISPLAY OFF | |
| 000420 | 0763 | | BINARY | |
| 001474 | 0764 | | P ← 0 | SET POINTER |
| 000416 | 0765 | | 0 -> C[X ] | PUT NEW CODE HERE |
| 000132 | 0766 | | A EXCHANGE B[W ] | |
| 001514 | 0767 | | 0 -> S BIG    13 | |
| 002320 | 0770 | | KEYS -> ROM ADDRESS | GO DO IT        E |
| 130001 | 1000 | F0:0: | GO TO FSLICE | 0,0 |
| 130001 | 1001 | | GO TO FSLICE | 0,1 |
| 130001 | 1002 | | GO TO FSLICE | 0,2 |
| 130001 | 1003 | | GO TO FSLICE | 0,3 |
| 130001 | 1004 | | GO TO FSLICE | 0,4 |
| 130002 | 1005 | | GO TO FFIX | 0,5 |
| 130003 | 1006 | | GO TO FSCI | 0,6 |
| 130004 | 1007 | | GO TO FENG | 0,7 |
| 000164 | 1010 | FVOID: | DELAYED ROM 1 | 0,8 |
| 130477 | 1011 | | GO TO $ERROR | 0,9 |
| 001104 | 1012 | | 1 -> S F    9 | 0,10 |
| 001204 | 1013 | | 1 -> S G    10 | 0,11 |
| 130006 | 1014 | | GO TO FROW | 0,12 |
| 001104 | 1015 | | 1 -> S F    9 | 0,13 |
| 001204 | 1016 | | 1 -> S G    10 | 0,14 |
| 130007 | 1017 | | GO TO FPLAIN | 0,15 |
| 130010 | 1020 | | GO TO FSTO | 1,10  STORE |
| 130011 | 1021 | | GO TO FRCL | 1,11  RECALL |
| 000742 | 1022 | | C + 1 -> C[P ] | 1,12  STORE - |
| 000742 | 1023 | | C + 1 -> C[P ] | 1,13  STORE + |
| 000742 | 1024 | | C + 1 -> C[P ] | 1,14  STORE * |
| 001410 | 1025 | | DECIMAL | 1,15 |
| 001242 | 1026 | | 0 - C - 1 -> C[P ] | INVERT |
| 001142 | 1027 | | C - 1 -> C[P ] | |
| 001142 | 1030 | | C - 1 -> C[P ] | |
| 001674 | 1031 | | P ← 5 | |
| 000130 | 1032 | | LOAD CONSTANT 1 | |
| 001574 | 1033 | | P ← 9 | |
| 000230 | 1034 | FSTO: | LOAD CONSTANT 2 | P= 6 OR 9 |

| Object Code | Step Number & ROM Address (in octal) | Sub-routine Label | Keycode | Remarks |
|---|---|---|---|---|
| 00330 | 1035 | | LOAD CONSTANT 3 | |
| 000232 | 1036 | FST01: | A EXCHANGE C[ W ] | |
| 130013 | 1037 | | GO TO FST02 | |
| 130005 | 1040 | F2-0: | GO TO FVOID | 2,0 |
| 130005 | 1041 | | GO TO FVOID | 2,1   25 |
| 130005 | 1042 | | GO TO FVOID | 2,2   24 |
| 010015 | 1043 | | JSB F25 | 2,3   25 |
| 000752 | 1044 | | C + 1 -> C[ XS ] | 2,4   22 |
| 130016 | 1045 | | IF N/C GO TO F21 | 2,5   21 |
| 000752 | 1046 | | C + 1 -> C[ XS ] | 2,6   34 |
| 000752 | 1047 | | C + 1 -> C[ XS ] | 2,7   33 |
| 000752 | 1050 | | C + 1 -> C[ XS ] | 2,8   32 |
| 130017 | 1051 | | IF N/C GO TO F31 | 2,9   31 |
| 000752 | 1052 | | C + 1 -> C[ XS ] | 2,10  74 |
| 010020 | 1053 | | JSB F73 | 2,11  73 |
| 000742 | 1054 | | C + 1 -> C[ P ] | 2,12  71 |
| 000742 | 1055 | | C + 1 -> C[ P ] | 2,13  61 |
| 000742 | 1056 | | C + 1 -> C[ P ] | 2,14  51 |
| 000742 | 1057 | | C + 1 -> C[ P ] | 2,15  41 |
| 000742 | 1060 | F31: | C + 1 -> C[ P ] | 31 |
| 000742 | 1061 | F21: | C + 1 -> C[ P ] | 21 |
| 000752 | 1062 | F11: | C + 1 -> C[ XS ] | 11 |
| 000742 | 1063 | | C + 1 -> C[ P ] | 10 |
| 000232 | 1064 | | A EXCHANGE C[ W ] | |
| 130022 | 1065 | | GO TO FTHRU | |
| 000310 | 1066 | $FORM: | DISPLAY OFF | KEY COORDINATES |
| 000236 | 1067 | | C -> A[ X ] | START HERE, CODE IN C10 C2=0 |
| 000436 | 1070 | | 0 -> C[ MS ] | |
| 000420 | 1071 | | BINARY | |
| 001176 | 1072 | | C - 1 -> C[ MS ] | |
| 001374 | 1073 | | P ← 6 | |
| 001114 | 1074 | | 0 -> S F    9 | |
| 001214 | 1075 | | 0 -> S G    10 | |
| 001614 | 1076 | | 0 -> S TOP  14 | |
| 010023 | 1077 | | JSB FG00 | ONLY RET ON ENG,FIX,SCI |
| 001604 | 1100 | | 1 -> S TOP  14 | MARK AS POSSIBLE FORMAT |
| 000716 | 1101 | FSLICE: | SHIFT LEFT A[ X ] | MOVE TO OTHER DIGIT |
| 000012 | 1102 | | 0 -> A[ XS ] | |
| 001410 | 1103 | | DECIMAL | |
| 000656 | 1104 | | A + 1 -> A[ X ] | FORCE DECIMAL CORRECTION |
| 000420 | 1105 | | BINARY | |
| 001512 | 1106 | | IF 0 # A[ XS ] | |
| 140024 | 1107 | | THEN GO TO FSTOOP | STORE OP |
| 001624 | 1110 | FGTO: | IF 1 = S TOP   14 | GTO HERE |
| 140026 | 1111 | | THEN GO TO FENG1 | BUT REALLY FORMATING |
| 000130 | 1112 | | LOAD CONSTANT 1 | P= 6 |
| 000330 | 1113 | | LOAD CONSTANT 3 | |
| 001174 | 1114 | | P ← 3 | |
| 000232 | 1115 | | A EXCHANGE C[ W ] | |
| 000706 | 1116 | | SHIFT LEFT A[ WP ] | |
| 130027 | 1117 | | GO TO FST03 | |
| 000402 | 1120 | FSTOOP: | 0 -> C[ P ] | STORE OP HERE |
| 000220 | 1121 | | A -> ROM ADDRESS | GO TO WHICH OP |
| 001746 | 1122 | FENG1: | SHIFT RIGHT C[ WP ] | FORMAT CONTINUES |
| 000130 | 1123 | | LOAD CONSTANT 1 | P=6 |
| 001574 | 1124 | | P ← 9 | |
| 010030 | 1125 | | JSB FF1 | LOAD A 21(F) |
| 000236 | 1126 | | A EXCHANGE C[ MS ] | UP DISPLAY |
| 000012 | 1127 | | 0 -> A[ XS ] | |
| 001174 | 1130 | FST02: | P ← 3 | |
| 000706 | 1131 | FST03: | SHIFT LEFT A[ WP ] | |
| 000420 | 1132 | FTHRU: | BINARY | END OF FORMATING |
| 000510 | 1133 | | M1 -> C | FINISH FORMATING |
| 000364 | 1134 | | DELAYED ROM 3 | |
| 130507 | 1135 | | GO TO $FTHR0 | |
| 000742 | 1136 | FENG: | C + 1 -> C[ P ] | |
| 000742 | 1137 | FSCI: | C + 1 -> C[ P ] | |
| 000742 | 1140 | FFIX: | C + 1 -> C[ P ] | |

| Object Code | Step Number & ROM Address (in octal) | Sub-routine Label | Keycode | Remarks |
|---|---|---|---|---|
| 000742 | 1141 | | C + 1 -> C[P ] | |
| 001020 | 1142 | | RETURN | |
| 010031 | 1143 | FPLAIN: | JSB FF? | |
| 001256 | 1144 | | 0 - C - 1 -> C[X ] | INVERT LAST DIGIT |
| 000256 | 1145 | | C -> A[X ] | |
| 000716 | 1146 | | SHIFT LEFT A[X ] | 0->1 |
| 000012 | 1147 | | 0 -> A[XS] | |
| 001174 | 1150 | | P ← 3 | |
| 000406 | 1151 | | 0 -> C[WP] | |
| 000652 | 1152 | FG02: | A + 1 -> A[XS] | LAND IN F2: * |
| 000652 | 1153 | FG01: | A + 1 -> A[XS] | LAND IN F1: * |
| 000220 | 1154 | FG00: | A -> ROM ADDRESS | LAND IN F0: * |
| 001234 | 1155 | FF?: | IF 0 = S G    10 | LOAD F OR G |
| 140034 | 1156 | | THEN GO TO FF3 | |
| 001134 | 1157 | | IF 1 = S F    9 | |
| 140032 | 1160 | | THEN GO TO FF1 | |
| 000130 | 1161 | FG1: | LOAD CONSTANT 1 | MAKE A G |
| 000530 | 1162 | | LOAD CONSTANT 5 | |
| 130036 | 1163 | | GO TO FF2 | |
| 000130 | 1164 | FF1: | LOAD CONSTANT 1 | MAKE A F |
| 000430 | 1165 | | LOAD CONSTANT 4 | |
| 001730 | 1166 | FF2: | LOAD CONSTANT 15 | |
| 001020 | 1167 | FF3: | RETURN | |
| 000752 | 1170 | F25: | C + 1 -> C[XS] | |
| 000752 | 1171 | F73: | C + 1 -> C[XS] | 73 |
| 000752 | 1172 | | C + 1 -> C[XS] | 72 |
| 001020 | 1173 | | RETURN | |
| 000230 | 1174 | FRCL: | LOAD CONSTANT 2 | |
| 000430 | 1175 | | LOAD CONSTANT 4 | |
| 130012 | 1176 | | GO TO FSTO1 | |
| 010031 | 1177 | FROW: | JSB FF? | |
| 000232 | 1200 | | A EXCHANGE C[W ] | |
| 000716 | 1201 | | SHIFT LEFT A[X ] | |
| 000012 | 1202 | | 0 -> A[XS] | |
| 130013 | 1203 | | GO TO FSTO2 | |
| 001565 | 1441 | $FTHRO: | IF 0 # C[M ] | AT ZERO            B23 |
| 140010 | 1442 | | THEN GO TO FTHRU1 | |
| 000032 | 1443 | | 0 -> A[W ] | |
| 001132 | 1444 | | A - 1 -> A[W ] | |
| 000574 | 1445 | FTHRU1: | P ← 2 | |
| 000232 | 1446 | | A EXCHANGE C[W ] | |
| 000720 | 1447 | FTHRU2: | P + 1 -> P | MOVE STEP # INTO PLACE |
| 000732 | 1450 | | SHIFT LEFT A[W ] | |
| 001454 | 1451 | | IF P # 11 | |
| 140011 | 1452 | | THEN GO TO FTHRU2 | |
| 000206 | 1453 | | A EXCHANGE C[WP] | BRING UP REST OF DISPLAY |
| 000432 | 1454 | | 0 -> C[W ] | ZAP |
| 000372 | 1455 | | B EXCHANGE C[W ] | SAVE DIGITS, MAKE ZERO MASK |
| 000334 | 1456 | | IF 0 = S RUNPGM | |
| 140457 | 1457 | | THEN GO TO $PLAIN | LOADING |
| 000210 | 1460 | | DISPLAY TOGGLE | TURN ON DISPLAY |
| 000164 | 1461 | | DELAYED ROM 1 | |
| 010501 | 1462 | | JSB $WAIT | WAIT FOR KEY TO COME UP |
| 000310 | 1463 | | DISPLAY OFF | |
| 000424 | 1464 | | IF 1 = S BST   4 | |
| 140467 | 1465 | | THEN GO TO $OUTPU | BST, SO DONT EXECUTE |
| 000372 | 1466 | | B EXCHANGE C[W ] | RECOVER DIGITS |
| 130454 | 1467 | | GO TO $GO | EXECUTING           E |
| 000510 | 1472 | FETCH: | M1 -> C | MEMORY FETCH        B14, |
| 000272 | 1473 | | C -> A[W ] | COPY |
| 000432 | 1474 | | 0 -> C[W ] | |
| 001474 | 1475 | | P ← 0 | |
| 001030 | 1476 | | LOAD CONSTANT 8 | START AT REG 9 |
| 001174 | 1477 | | P ← 3 | |
| 000730 | 1500 | | LOAD CONSTANT 7 | # STEPS PER WORD |
| 001474 | 1501 | | P ← 0 | |
| 001410 | 1502 | | DECIMAL | |
| 001126 | 1503 | | A - 1 -> A[M ] | OFFSET |

| Object Code | Step Number & ROM Address (in octal) | Sub-routine Label | Keycode | Remarks | |
|---|---|---|---|---|---|
| 130015 | 1504 | | IF N/C GO TO FETCH1 | CHECK FOR ZERO | |
| 000114 | 1505 | | 0 -> S STOP 1 | STOP RUNNING | |
| 000432 | 1506 | | 0 -> C[W] | | |
| 001020 | 1507 | | RETURN | | E |
| 001410 | 1545 | FETCH2: | DECIMAL | | B9 |
| 001626 | 1546 | | A - C -> A[M] | MINUS SEVEN | |
| 130015 | 1547 | | IF N/C GO TO FETCH1 | | |
| 001160 | 1550 | | C -> DATA ADDRESS | TURN ON RIGHT REG | |
| 000232 | 1551 | | A EXCHANGE C[W] | COPY | |
| 000272 | 1552 | | C -> A[W] | | |
| 000666 | 1553 | FETCH3: | A + 1 -> A[M] | UP NEG STEP NUM | |
| 130026 | 1554 | | IF N/C GO TO FETCH4 | | |
| 001020 | 1555 | | RETURN | POINTER IS SET | E |
| 000510 | 1634 | $ER/S2: | M1 -> C | STATUS WORD | |
| 001566 | 1635 | | IF 0 # C[M] | NOT AT START | |
| 140044 | 1636 | | THEN GO TO ER/S3 | | |
| 000766 | 1637 | | C + 1 -> C[M] | START AT ONE | |
| 000410 | 1640 | | M1 EXCHANGE C | SAVE | |
| 130456 | 1641 | ER/S3: | GO TO $SST4 | GO FETCH AND RUN | |
| 000729 | 1654 | FETCH4: | P + 1 -> P | | |
| 000720 | 1655 | | P + 1 -> P | | |
| 130025 | 1656 | | GO TO FETCH3 | | |
| 001772 | 1657 | SST2: | SHIFT RIGHT C[W] | | |
| 000620 | 1660 | | P - 1 -> P | | |
| 130046 | 1661 | | GO TO SST3 | | |
| 001124 | 1664 | ESST: | IF 1 = S F 9 | | B13 264 |
| 140476 | 1665 | | THEN GO TO $EFIX | | |
| 000414 | 1666 | | 0 -> S BST 4 | | |
| 000324 | 1667 | | IF 1 = S RUNPGM 3 | IF RUNNING | |
| 140466 | 1670 | | THEN GO TO $ER/S2 | GO CHECK FOR ZERO | |
| 010510 | 1671 | | JSB $INC | | |
| 010014 | 1672 | $SST4: | JSB FETCH | | |
| 000070 | 1673 | SST1: | DATA -> C | | |
| 001354 | 1674 | SST3: | IF P # 0 | | |
| 140045 | 1675 | | THEN GO TO SST2 | | |
| 000412 | 1676 | | 0 -> C[XS] | | |
| 000264 | 1677 | | DELAYED ROM 2 | | |
| 130506 | 1700 | | GO TO $FORM | | E |
| 000420 | 1701 | FETCH1: | BINARY | | B8 |
| 000742 | 1702 | | C + 1 -> C[P] | NEXT REGISTER | |
| 130024 | 1703 | | IF N/C GO TO FETCH2 | | |
| 000510 | 1704 | | M1 -> C | THAT WAS LAST REG | |
| 000426 | 1705 | | 0 -> C[M] | SET TO ZERO | |
| 000410 | 1706 | | M1 EXCHANGE C | STORE ZERO STEP# | |
| 000114 | 1707 | FETCH5: | 0 -> S STOP 1 | STOP | |
| 130465 | 1710 | | GO TO $QTHR1 | | E |
| 001724 | 1754 | $GO: | IF 1 = S KEY 15 | IS THERE A KEY DOWN | |
| 140051 | 1755 | | THEN GO TO FETCH5 | GO TURN OFF | |
| 000210 | 1756 | | DISPLAY TOGGLE | | |
| 010014 | 1757 | | JSB FETCH | TURN ON REG, SET P | |
| 010510 | 1760 | | JSB $INC | | |
| 000070 | 1761 | | DATA -> C | GET REGISTER | |
| 001354 | 1762 | GO2: | IF P # 0 | | |
| 140035 | 1763 | | THEN GO TO GO3 | | |
| 000436 | 1764 | | 0 -> C[MS] | | |
| 000310 | 1765 | | DISPLAY OFF | | |
| 000412 | 1766 | EXECUT: | 0 -> C[XS] | CODE IS IN C10; EXECUTE IT | |
| 000256 | 1767 | | C -> A[X] | | |
| 000352 | 1770 | | A + 1 -> A[XS] | | |
| 000220 | 1771 | | A -> ROM ADDRESS | JUMP, JUMP, JUMP | |
| 001410 | 1772 | $INC: | DECIMAL | INCREMENT STEP # | |
| 000510 | 1773 | | M1 -> C | | |
| 000766 | 1774 | | C + 1 -> C[M] | | |
| 000410 | 1775 | INC1: | M1 EXCHANGE C | | |
| 000420 | 1776 | | BINARY | | |
| 001020 | 1777 | | RETURN | | |

I claim:

1. A programmable calculator for storing and executing a program having a plurality of program steps, said calculator comprising:

keyboard means having a keyboard unit with a plurality of keys for entering data and program steps including a single-step key for initiating single-step operations and having means for generating a signal indicative of said single-step key being depressed and for terminating the generation of said signal, the terminating being indicative of said single-step key being released from it depressed position;

storage means coupled to said keyboard means for receiving and storing entered program steps;

display means for displaying stored program steps, step numbers, and results of executions of said steps; and processing means coupled to the keyboard means, to the storage means, and to the display means for causing the display means to display a stored porgram step and step number responsive to said signal indicative of depression of the single-step key, and for executing the displayed step and for causing the display means to display the result of said execution in response to the absence of said signal indicative of release of the single-step key from its depressed position.

2. The calculator of claim 1 wherein said keyboard means includes a switching device coupled to said processing means for providing for data and program steps to be entered when the switching device is set to program mode, and for single-step and other operations to be performed when the switching device is set to run mode.

3. The calculator of claim 2 wherein said storage means comprises at least one read-write memory unit coupled to said processing means for receiving and storing data and program steps received via said processing means from said keyboard means during the program mode.

4. The calculator of claim 3 including a read-write program counter for numbering program steps, said read-write program counter being coupled to said processing means and to said read-write memory unit enabling the processing means to access a program step in the read-write memory unit utilizing the content of the program counter as an address of said program step in response to an actuation of the single-step key.

5. The calculator of claim 4 wherein said storage means further comprises at least one read-write memory buffer for temporarily storing program steps received from said read-write memory unit, said read-write memory buffer being coupled to said read-write memory unit and to said processing means for receiving program steps from said read-write memory unit and forwarding said program steps to said processing means.

6. The calculator of claim 5 wherein said means for generating is a keyboard encoder and said signal is a keydown signal, the keyboard encoder providing said keyboard signal and key-identifying signals to said processing means, said keyboard encoder being coupled to said keyboard unit and to said processing means for providing signals to said processing means in response to entries from the keyboard.

7. The calculator of claim 6 further including a read-only memory unit having a routine stored therein for controlling single-step operations, said read-only memory unit being coupled to said processing means and to said keyboard means, a single-step operation being performed in accordance with the stored routine, in response to an actuation of the single-step key.

8. The calculator of claim 7 wherein said display means comprises a display decoder unit coupled to said processing means and an LED output display unit coupled to said display decoder unit for displaying data that is produced by the processing means and formatted for display by the display decoder unit.

9. The calculator of claim 8 wherein:

the processing means, in response to the applied keydown signal, first accesses the program step stored in the read-write memory unit at the address corresponding to the step number contained in the read-write program counter, next stores the accessed program step into the read-write memory buffer, then applies the step number and the stored program step to the display decoder unit, and, in response to said stoppage in application of the keydown signal by the keyboard encoder, increments the step number stored in the read-write program counter, executes the program step stored in the read-write memory buffer, and applies the result of said execution to the display decoder unit;

the display decoder unit, in response to application of said step and step number by the processing means, decodes the applied step and step number and, in response to the application of said execution result, decodes the execution result; and the LED output display unit displays the decoded step and step number in response to the application of said decoded step and step number by the display decoder unit, and displays the decoded execution result in response to application of said decoded execution result by the display decoder unit.

* * * * *